United States Patent [19]

Nendzig et al.

[11] 3,916,771
[45] Nov. 4, 1975

[54] SEALING ARRANGEMENT

[75] Inventors: Gerhard Nendzig; Elmar Müller, both of Urach, Germany

[73] Assignee: Pumpenfabrik Urach, Urach, Germany

[22] Filed: June 6, 1974

[21] Appl. No.: 477,089

[30] Foreign Application Priority Data
June 7, 1973  Germany............................ 2328963

[52] U.S. Cl. ........................ 92/86; 92/165; 277/27; 417/568
[51] Int. Cl.² ..................... F01B 31/20; F16J 15/18
[58] Field of Search ...... 92/162 R, 162 P, 8 C, 165, 92/167, 168; 277/27, 53; 417/437, 568

[56] References Cited
UNITED STATES PATENTS

| | | | |
|---|---|---|---|
| 3,438,638 | 4/1969 | Newcomb et al..................... | 277/27 |
| 3,443,814 | 5/1969 | Dahlheimer .......................... | 277/27 |
| 3,742,822 | 7/1973 | Talbert ................................. | 92/168 |

FOREIGN PATENTS OR APPLICATIONS

| | | | |
|---|---|---|---|
| 996,280 | 6/1965 | United Kingdom................. | 417/568 |
| 1,093,530 | 12/1967 | United Kingdom................... | 277/27 |

*Primary Examiner*—Paul E. Maslousky
*Attorney, Agent, or Firm*—Michael S. Striker

[57] ABSTRACT

A housing has a pressure chamber and an outlet, and a reciprocable element is mounted in the housing. A deformable sealing sleeve surrounds the reciprocable element and has an inner and an outer surface. The inner surface forms with the reciprocable element an annular axial gap communicating at one end thereof with the pressure chamber and at the other end thereof with the outlet so that the pressure in this gap decreases from the one end to the other end. The outer surface of the sealing sleeve forms with the housing a closed control chamber along the length of the sleeve and which communicates with the pressure chamber so that equal high pressure in the control chamber opposes the pressure acting in the gap on the sleeve. Thus, the sleeve is deformed and the diameter thereof is reduced in the region of the other end of the gap. A mounting arrangement mounts the sleeve for limited radial and angular displacement relative to the housing and the reciprocable element.

19 Claims, 2 Drawing Figures

SEALING ARRANGEMENT

BACKGROUND OF THE INVENTION

The present invention is generally directed to a sealing arrangement, and more particularly to an arrangement for sealing reciprocable elements such as pistons, piston rods or the like, especially of pumps, which are located in a housing.

In such constructions it is known to mount on the piston, as the reciprocable element will hereafter be referred to for the sake of convenience and brevity, a sealing sleeve which forms an annular axial sealing gap or clearance with the piston. The required sealing effect is, however, difficult to achieve at very high pressure because the leakage losses rise in dependence upon the pressure magnitude. On the other hand, within the axial gap itself a pressure drop takes place which is substantially proportional to the increased axial distance from the high pressure region; this means that the sealing sleeve is subjected to greater pressure by radial forces which develop in the gap in the region of the high pressure, than in the region of the low pressure at the other end of the gap.

The result of this is that this varying load, which drops proportionately in axial direction and acts in radial direction, causes in prior-art apparatus a radial expansion of the sealing sleeve in the region of the high pressure end, corresponding with the elasticity of the sleeve. Assuming a minimum gap width at the low pressure end, this results in increased leakage losses which rise in dependence on the pressure of the fluid pumped by the piston.

The problem becomes the more pronounced, the lower the viscosity of the pumped liquid, especially when the liquid is water or another non-lubricating substance. In consequence, when the sealing gap is sufficient, great leakage losses take place, and when the sealing gap is reduced, the surfaces which slide on one another are damaged because the piston and the sleeve do not maintain a centered position relative to one another and can come into contact.

The copending application to F. E. Breit, Ser. No. 327,219, which is commonly assigned with the present application, proposes to overcome the prior-art difficulties and to provide an apparatus which satisfactorily operates even with non-lubricating liquids of low viscosity, as well as at high operating fluid pressures and great speed of relatively slidable parts. To this end, the aforementioned application provides an arrangement wherein an axial sealing gap extends from the high pressure side continuously to an outlet into a low pressure region at the end of the sleeve remote from the high pressure region. The rear face of the sealing sleeve which is radially remote from the axial sealing gap is bounded in accordance with the concept expressed in that application by a control chamber filled with high pressure fluid and communicating with the high pressure region. The control chamber extends substantially over the length of the axial gap and is closed and sealed from the outlet of the gap. The axial gap and the sealing sleeve are so dimensioned that at full pressure at the high pressure side, the gap is reduced in the region of the low pressure side to form a funnel-shaped gap having a width at which there is still no contact between the sleeve and the piston. With this arrangement, even non-lubricating liquids having low viscosity can be sealed, even at very high pressures, and the leakage losses can be reduced to a minimum required for preventing damage to the relatively movable parts. The sealing arrangement actually works the better, the higher the relative speed of the parts is. The reciprocable component, e.g. the piston, is preferably mounted for universal movement so that it can center itself automatically.

However, although the aforementioned application provides for a very substantial improvement over the state of the art that existed prior to it, it has been found that further improvement is still desirable in certain respects.

In particular, if the relatively movable elements have a rather large diameter difficulties were experienced because, due to the large masses involved, the contact between the relatively movable parts was more difficult to avoid than was originally thought possible.

Another problem encountered results from the fact that the self-centering of the piston in the aforementioned application requires a certain amount of play between the piston and the drive component which effects the reciprocation of the same. This aids in the self-centering of the piston per se, but causes — particularly in the case of relatively large components to be moved — undesirable noises which could not be readily overcome.

SUMMARY OF THE INVENTION

Accordingly, it is a general object of the present invention to provide an improved sealing arrangement of the type in question, which affords the above-outlined desired advantages.

More particularly, it is an object of the present invention to provide such an improved sealing arrangement which is of a construction that is even simpler than that of the aforementioned application and which assures self-centering of the relatively movable components even if these components have relatively large dimensions.

In keeping with the above objects, and with others which will become apparent hereafter, one feature of the invention resides in a sealing arrangement which, briefly stated, comprises housing means having a pressure chamber and an outlet, and reciprocable means mounted in this housing means. A deformable sealing sleeve is provided in the housing means and surrounds the reciprocable means, having inner and outer surfaces one of which forms with one of the aforementioned means an annular axial gap communicating at one end thereof with the pressure chamber and at the other end thereof with the outlet so that the pressure in this gap decreases from the one to the other end thereof. The other of the surfaces forms with the other of the means a closed control chamber along the length of the sleeve and in communication with the pressure chamber, so that equal high pressure in the control chamber opposes the pressure acting in the cap on the sleeve whereby the sleeve is deformed and the diameter thereof is reduced in the region of the other end of the cap. Mounting means is provided which mounts the sleeve for limited radial and angular displacement transversely of the reciprocable means.

This displacement is, of course, a self-centering nature so that the sleeve can adjust its position with reference to the reciprocable means in such a manner that a sealing gap develops which is substantially uniform over the entire circumference of the reciprocable means and which, due to the deformation of the sleeve under pressure, tapers in a substantially conical manner in the direction from the high-pressure end towards the low-pressure end.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
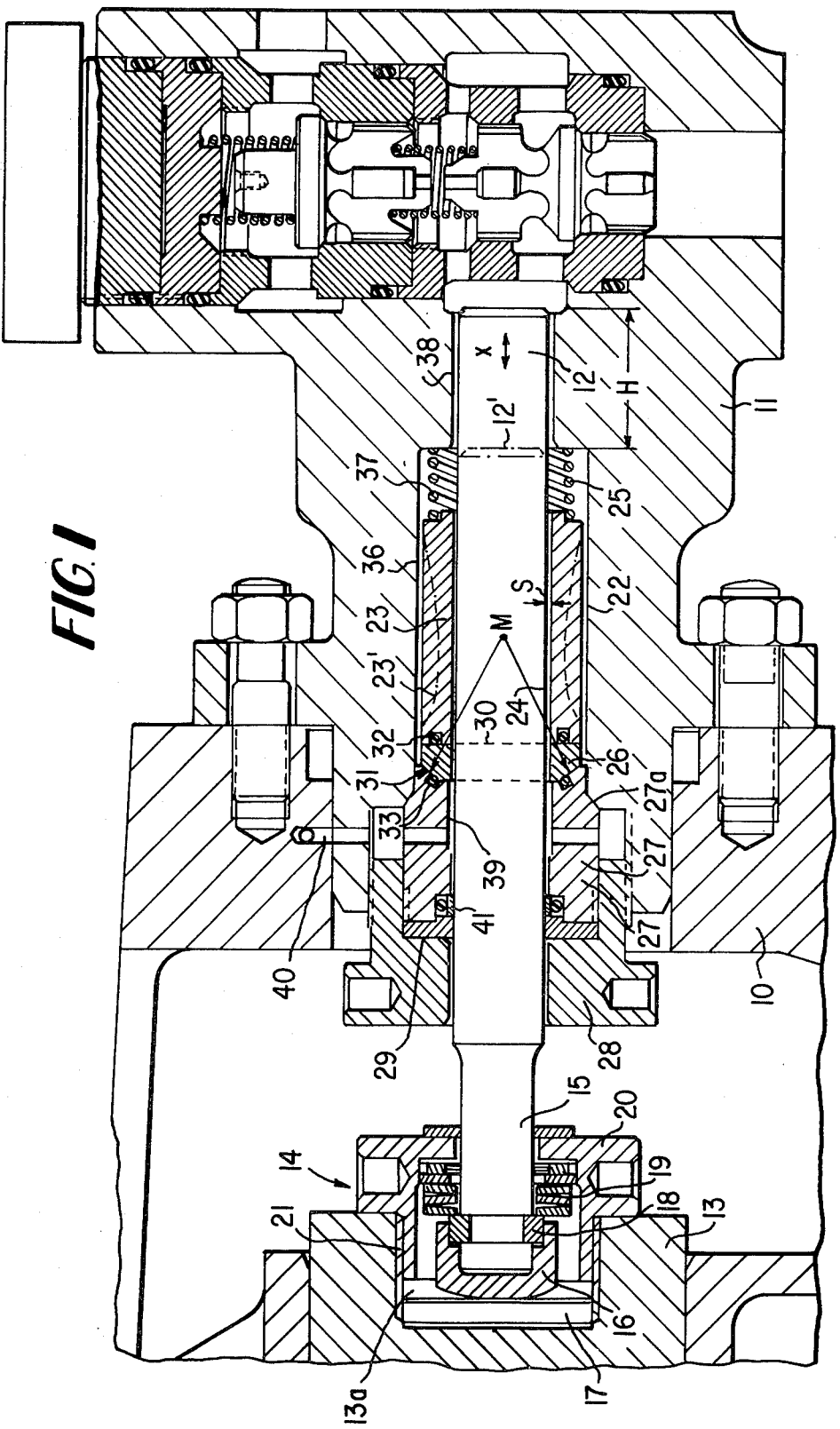
FIG. 1 is a fragmentary axial section showing a piston pump provided with a sealing sleeve arrangement according to one embodiment of the invention.

Referring firstly to the embodiment illustrated in FIG. 1, it will be seen that reference numeral 10 identifies a housing, and reference numeral 11 identifies a cylinder housing block which is rigidly connected with the housing 10, for instance in the illustrated manner by bolting it to the housing 10. A cylinder head is diagrammatically illustrated at the right-hand end of FIG. 1 and can be constructed in any desired manner, for example in the manner disclosed in the aforementioned copending application. There is formed a pressure chamber P which communicates with the bore in the housing 10 in which a piston 12, constituting the reciprocable means, is reciprocable in the direction of the arrow X. The end position of the piston 12 during its suction stroke is identified by the broken-line showing of its end face 12', whereas its end position during the pressure stroke is shown in full lines; the length of the stroke performed by the piston 12 between its opposite end positions is identified by the arrow H.

The piston 12 may be reciprocated in any desired manner, for instance by means of a (not illustrated) crank shaft which operates a cross-head 13; the piston 12 is coupled with the cross-head by a coupling 14 and for this purpose is provided on its end portion 15 with an end cap 16 which is received in a recess 13a of the cross-head 13, in which there is also located an axial end piece 17 against which the arcuately curved exposed outer face of the end cap 16 abuts. The end portion 15 is further provided with a circumferentially extending groove in which a retaining ring 18 (for instance a circlip or a two-part washer) is received to serve as an abutment. A spring arrangement 19, here in form of a set of dished or Belleville springs, urges the piston 12 firmly against the axial end piece 17 by bearing upon the retaining ring 18 and against a nut 20 which is threaded into the cross-head 13 by means of screw threads 21.

The cylinder housing block 11 is formed with a bore or passage 22 in which there is received a sealing sleeve 23 the inner diameter of which is slightly larger than the outer diameter of the piston 12. This assures that when the piston 12 and the sealing sleeve 23 are concentric with one another, there will be a uniform or at least substantially uniform annular sealing gap 24 formed between them; the gap will advantageously have a width of approximately 0.005–0.1 millimeter. A spring 25 abuts the right-hand end of the sleeve 23, that is the end facing towards the pressure chamber P, and bears upon an end wall bounding the bore 22, thus urging the sleeve 23 towards the left in FIG. 1 against an intermediate sealing ring 26 which in turn is pressed into abutment against a stationary component 27 which is centrally mounted in the cylinder housing block 11 and is pressed by a nut 28 against a conical surface 27a of the cylinder housing block 11, via an interposed sealing washer 29.

In the illustrated embodiment, the intermediate sealing ring 26 has a planar end face 30 which extends normal to the longitudinal axis of the piston 12 and the sleeve 23, and which is engaged by the left-hand end of the sleeve 23. Another axial end face 31 of the intermediate sealing ring 26 is spherically curved and abuts the stationary component 27; the center of curvature M of the end face 31 is located on or close to the longitudinal axis of the sealing sleeve 23. A pair of O-rings 32, 33 is provided which cooperate with the intermediate sealing ring 26 to seal the outer control chamber 36 which is established between the exterior surface of the sleeve 23 and the interior surface bounding the bore 22, with reference to the left-hand end of the gap 24 and with reference to the outlet chamber 39 which communicates with a return flow conduit 40.

Figure 2:
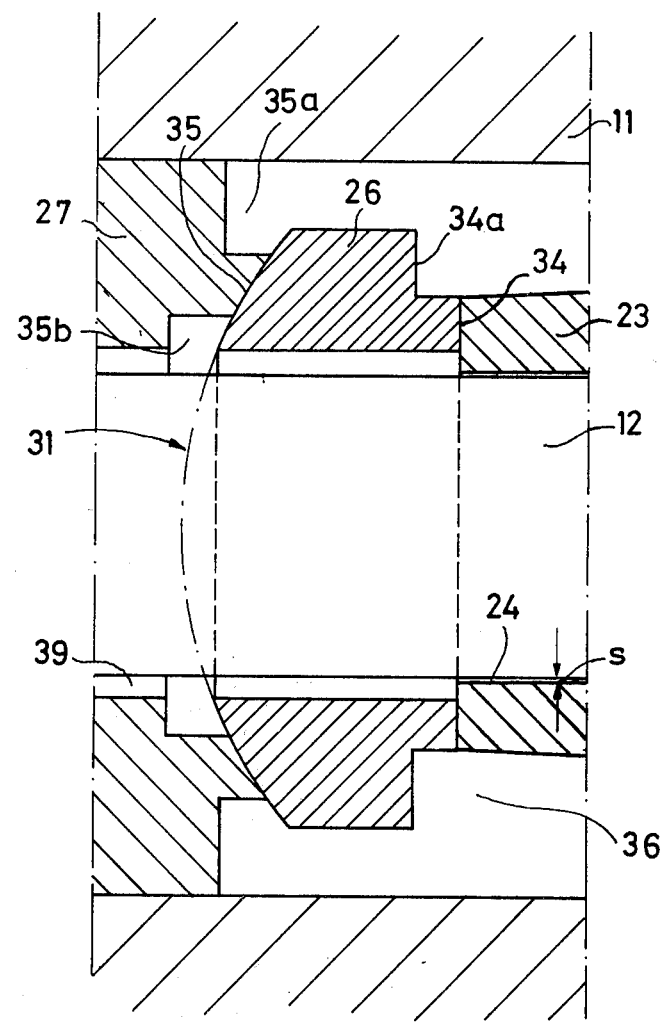
FIG. 2 is a fragmentary axial sectional detail view, showing a detail of a second embodiment of the invention.

The embodiment in FIG. 2 corresponds in its particulars to that of FIG. 1, except for the features which will now be described before the description of FIG. 1 is completed. In FIG. 2, the O-rings 32, 33 are omitted and the sealing of the control chamber 36 with reference to the outlet chamber 39 is effected only via machined and polished surfaces 34, 35. The surface 34 of the sealing ring 26 extends normal to the longitudinal axis of the sleeve 23 and is abutted by the latter. The surface 35 constitutes a part of the spherically curved axial end face 31. Radially outwardly and radially inwardly of the surface 35 there are located recesses 35a and 35b which are exposed to the fluid pressures in chambers 36 and 39, respectively. The recess 35a is so dimensioned that it provides for a partial compensation of the pressure exerted from the high pressure end of the sleeve 23 upon the sealing ring 26 via the surface 34 and the recess 34a formed in the surface 34.

Returning to the description of FIG. 1, which is also applicable to FIG. 2 except for the differences noted above, it will be seen that at the radially outer side of the sleeve 23 there is formed the aforementioned control chamber 36 which is in communication with the pressure chamber P via the space 37 in which the spring 25 is located, and an annular channel 38 surrounding the piston 12 when the latter moves from its retracted suction position to its extended working position. Thus, the control chamber 36 will always be at identically the same, or at least substantially the same pressure as the pressure chamber P.

It will be evident from the previous description that at the left-hand end of the control chamber 36, that is the end which is remote from the pressure chamber P, the control chamber 36 will be sealed by the sealing ring 26 and the O-rings 32, 33 of FIG. 1 (or the sealing surfaces 34 and 35 of FIG. 2) with reference to the outlet chamber 39. However, the sealing gap 24 of course communicates directly with the outlet chamber 39, as shown in FIG. 1. The outlet chamber 39 communicates via the aforementioned return flow conduit 40 either with the ambient atmosphere, or with a fluid reservoir for the working fluid, or with the suction conduit of the apparatus. A sealing ring 41 is held in place by the sealing washer 29 and as a rule performs only the function of a stripping seal, when an outflow of the leakage fluid into the interior of the housing of the machine is not desired. If this is of no importance, then the sealing ring 41 could be omitted.

It will be appreciated that while in the illustrated embodiments the sealing sleeve 23 has cylindrical inner and outer surfaces, it could have a non-uniform wall thickness; for instance, as indicated at 23' in broken lines the wall thickness of the sealing ring 23 could taper from the opposite ends towards the middle, or conversely it could bulge from the opposite ends towards the middle. It could also be of substantially conical contour, or indeed of any desired configuration.

The arrangement according to which the sleeve 23 is supported against the sealing ring 26 having the illustrated configuration, provides for a simplified self-centering action for the sleeve 23, and eliminates any need for interposing between the cross-head 13 and the piston 12 any noise-deadening components.

By having the center of curvature M of the spherically configurated end face 31 of the sealing ring 26 located on or substantially on the longitudinal axis of the sleeve 23, the self-centering of the sleeve 23 with reference to the piston 12 will require a minimum of force since forces which counteract the self-centering tendency of the sleeve 23 are largely avoided, and the desired essentially conical tapering of the gap 24 (in operation of the arrangement) can be more reliably obtained.

The operation of the arrangement will be clear from what has been set forth above. When the piston 12 moves out of its end position which it assumes at the end of its suction stroke, and travels towards the right in FIG. 1, it produces pressure in the fluid in the pressure chamber P, and some of this fluid is pressed through the gap 24 into the outlet chamber 39 and from there into the return flow conduit 40. When this takes place, the pressure which acts within the gap 24 in radially outward direction upon the sleeve 23 decreases continuously in direction from the high-pressure side (the right-hand end of the gap 24) towards the low-pressure side (the left-hand end of the gap 24). By contrast, the radially inwardly directed fluid pressure which acts upon the sleeve 23 in the control chamber 36 will be uniform throughout the axial length of the control chamber 36. Thus, while the radially inwardly and the radially outwardly directed pressures compensate for one another at the right-hand end of the gap 24, the radially inwardly directed pressure in the control chamber 36 exceeds the radially outwardly directed pressure in the gap 24 to an increase in degree in the direction away from the right-hand end of the gap 24 and towards the left-hand end of the gap 24. As a result of this, the sleeve 23 will be compressed radially inwardly to an increasing extent in the direction towards the left-hand end, so that the gap 24 will similarly conically decrease in this direction, but in such a manner that even at the narrowest location of the gap 24 the latter will still have a width S which assures that any surface contact between the sleeve 23 and the piston 12 is reliably precluded under all operating conditions.

The sealing sleeve 23 is of course supported against the sealing ring 26 on the planar right-hand end face 30 of the latter, whereas the sealing ring 26 in turn is supported with respect to the stationary component 27 via its spherically curved left-hand end face 31. Because of this, the sealing sleeve 23 can freely perform self-centering movements, i.e. it can move radially along the end face 30 and also at an angle to the longitudinal axis of the sleeve 12 due to tilting on the surface 31, so that the sleeve can center itself with respect to the piston 12 under the influence of the radially inward and radially outward pressure which act upon it. The fluid exerting this pressure enters from the pressure chamber P into the gap 24 which decreases towards the left-hand end of FIG. 1 for the reasons outlined earlier, and which has its narrowest width approximately in the region of the end face 30. The fluid which enters under pressure into the gap 24 assures the self-centering of the freely adjustable sleeve 23 under all conditions. Since the radius of curvature M of the surface 31 is located at or near the longitudinal axis of the sleeve 23, the self-centering of the sleeve is particularly simple and efficacious.

The piston 12 is pressed firmly against the cross-head 13 by means of the spring or springs 19, thus assuring that it has no play with respect to the cross-head 13 and in effect constitutes a unit with the cross-head 13 insofar as kinematic considerations are concerned. Thus, the desired self-centering of sleeve 23 and piston 12 occurs in the present invention essentially only due to the self-centering movements of the sleeve 23, and not due to movements of the piston 12, and this eliminates the previously objectionable element of noise resulting from the fact that in the prior art the piston 12 had a certain limited freedom of axial play with reference to its drive component, such as the cross-head 13.

It will be understood that each of the elements described above, or two or more together, may also find a useful application in other types of constructions differing from the types described above.

While the invention has been illustrated and described as embodied in a sealing arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims is:

1. A sealing arrangement, comprising housing means having a pressure chamber and an outlet; reciprocable means mounted in said housing means; a deformable sealing sleeve in said housing means surrounding said reciprocable means and having inner and outer surfaces one of said surfaces forming with one of said means an annular axial gap communicating at one end thereof with said pressure chamber and at the other end thereof with said outlet so that the pressure in said gap decreases from said one end to said other end, and the other surface forming with the other one of said means a closed control chamber along the length of said sleeve communicating with said pressure chamber so that equal high pressure in said control chamber opposes the pressure acting in said gap on said sleeve whereby said sleeve is deformed and the diameter thereof is reduced in the region of said other end of said gap; and mounting means mounting said sleeve for limited radial and angular self-centering displacement transversely of said reciprocable means, said mounting means including a spherically curved axial face, said mounting means establishing at least an indirect connection between said sealing sleeve and said housing means.

2. Arrangement as defined in claim 1, wherein said one surface is said inner surface of said sleeve and said other surface is the outer surface of said sleeve; and wherein said one means is said reciprocable means and said other means is said housing means so that said gap is formed between said reciprocable means and said sleeve, and said control chamber is formed between said housing means and said sleeve.

3. Arrangement as defined in claim 1, wherein said gap is open at said other end.

4. Arrangement as defined in claim 1, comprising drive means reciprocating in axial direction of said reciprocable means; and coupling means supporting said reciprocable means on said drive means for movement therewith.

5. Arrangement as defined in claim 4, wherein said coupling means includes a convex coupling portion at one end of said reciprocable means, and a part of said drive means cooperating with said convex coupling portion.

6. Arrangement as defined in claim 5, wherein said part has a concave seat, and wherein said convex coupling portion has a part-spherical surface abutting said concave seat of said part of said drive means.

7. A sealing arrangement, comprising housing means having a pressure chamber and an outlet; reciprocable means mounted in said housing means; drive means reciprocating in axial direction of said reciprocable means; coupling means supporting said reciprocable means on said drive means for movement therewith and including a convex coupling portion at one end of said reciprocable means, and (abuttingly received in a concave) seat of said drive means; a deformable sealing sleeve in said housing means surrounding said reciprocable means and having inner and outer surfaces, one of said surfaces forming with one of said means an annular axial gap communicating at one end thereof with said pressure chamber and at the other end thereof with said outlet so that the pressure in said gap decreases from said one end to said other end, and the other surface forming with the other one of said means a closed control chamber along the length of said sleeve communicating with said pressure chamber so that equal high pressure in said control chamber opposes the pressure acting in said gap on said sleeve whereby said sleeve is deformed and the diameter thereof is reduced in the region of said other end of said gap; and mounting means mounting said sleeve for limited radial and angular self-centering displacement transversely of said reciprocable means.

8. Arrangement as defined in claim 7, wherein said coupling means includes cooperating coupling portions on said drive means and said reciprocable means, and biasing means urging said coupling portions into coupling engagement with one another.

9. A sealing arrangement, comprising housing means having a pressure chamber and an outlet; reciprocable means mounted in said housing means; a deformable sealing sleeve in said housing means surrounding said reciprocable means and having inner and outer surfaces, one of said surfaces forming with one of said means an annular axial gap communicating at one end thereof with said pressure chamber and at the other end thereof with said outlet so that the pressure in said gap decreases from said one end to said other end, and the other surface forming with the other one of said means a closed control chamber along the length of said sleeve communicating with said pressure chamber so that equal high pressure in said control chamber opposes the pressure acting in said gap on said sleeve whereby said sleeve is deformed and the diameter thereof is reduced in the region of said other end of said gap, said control chamber having an end portion remote from said pressure chamber; and mounting means mounting said sleeve for limited radial and angular self-centering displacement transversely of said reciprocable means, said mounting means comprising a washer surrounding said reciprocable means in the region of said end portion of said control chamber and having a spherically curved first axial end face and a second axial end face, one of said end faces abutting said sealing sleeve.

10. Arrangement as defined in claim 9, said sealing sleeve having a longitudinal center axis; and wherein the center of curvature of said spherically curved first axial end face is located at least substantially on said center axis.

11. Arrangement as defined in claim 9; further comprising a stationary component located in said housing means; and wherein said first axial end face engages said stationary component, and said second axial end face is planar in direction normal to said central axis and engages said sealing sleeve.

12. Arrangement as defined in claim 9; further comprising a stationary component located in said housing means and which is engaged by the other of said axial end faces; and sealing means sealing said washer with reference to said stationary component and said sleeve against fluid flow axially of said control chamber past said washer.

13. Arrangement as defined in claim 9; further comprising a stationary component located in said housing means, the other of said axial end faces axially engaging said stationary component and defining at least one annular recess which surrounds said reciprocable means and communicates with said control chamber.

14. Arrangement as defined in claim 9; further comprising a stationary component located in said housing means and surrounding said reciprocable means, the other of said axial end faces being in sealing engagement with said stationary component; and further comprising biasing means biasing said sealing sleeve into said abutment with said one axial end face.

15. Arrangement as defined in claim 9, wherein said one surface of said inner surface of said sleeve and said other surface is the outer surface of said sleeve; and wherein said one means is said reciprocable means and said other means is said housing means so that said gap is formed between said reciprocable means and said sleeve, and said control chamber is formed between said housing means and said sleeve.

16. Arrangement as defined in claim 9, wherein said gap is open at said other end.

17. Arrangement as defined in claim 9, comprising drive means reciprocating in axial direction of said reciprocable means; and coupling means supporting said reciprocable means on said drive means for movement therewith.

18. Arrangement as defined in claim 17, wherein said coupling means includes a convex coupling portion at one end of said piston means, and a part of said drive means cooperating with said convex coupling portion.

19. A sealing arrangement, comprising housing means having a pressure chamber and an outlet; reciprocable means mounted in said housing means; a deformable sealing sleeve in said housing means coaxial with said reciprocable means and having inner and outer surfaces, one of said surfaces forming with one of said means an annular axial gap communicating at one end thereof with said pressure chamber and at the other end thereof with said outlet so that the pressure in said gap decreases from said one end to said other end, and the other surface forming with the other one of said means a closed control chamber along the length of said sleeve communicating with said pressure chamber so that equal high pressure in said control chamber opposes the pressure acting in said gap on said sleeve whereby said sleeve is deformed and the diameter thereof is reduced in the region of said other end of said gap, said control chamber having an end portion remote from said pressure chamber; and mounting means mounting said sleeve for limited radial and angular self-centering displacement transversely of said reciprocable means, said mounting means comprising a washer surrounding said reciprocable means in the region of said end portion of said control chamber and having a spherically curved first axial end face and a second axial end face, one of said end faces abutting said sealing sleeve.

* * * * *